Oct. 17, 1933.  E. M. WEATHERFORD  1,930,573
INSTRUMENT PANEL EMBODYING THEFT FOIL FOR VALUABLES
Filed Jan. 14, 1932   2 Sheets-Sheet 1
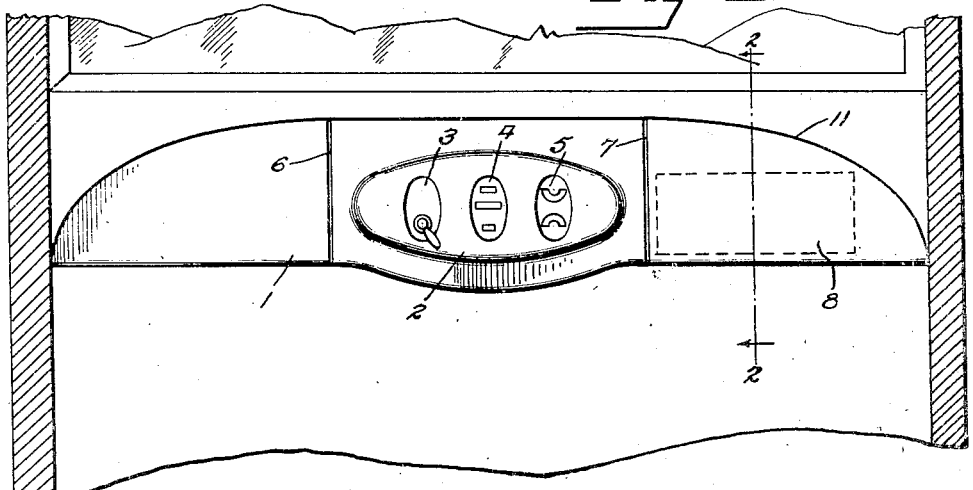
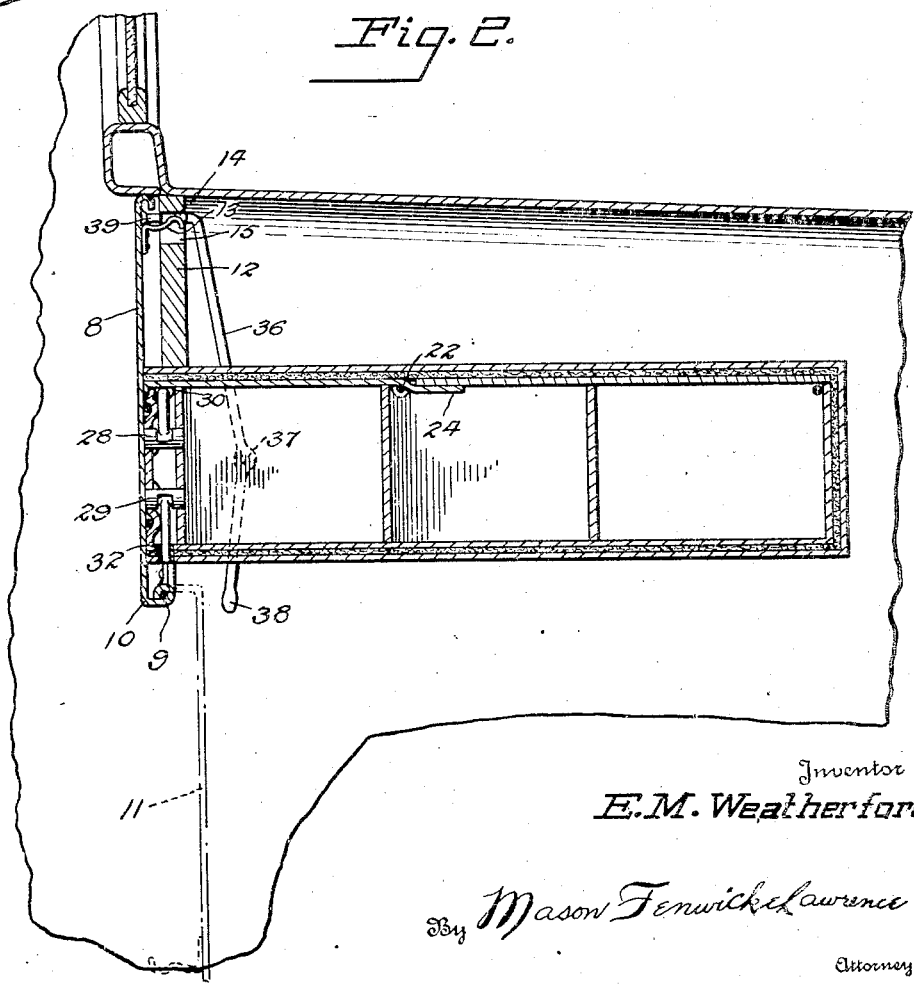
Inventor
E. M. Weatherford
By Mason Fenwick & Lawrence
Attorney Oct. 17, 1933.  E. M. WEATHERFORD  1,930,573
INSTRUMENT PANEL EMBODYING THEFT FOIL FOR VALUABLES
Filed Jan. 14, 1932  2 Sheets-Sheet 2
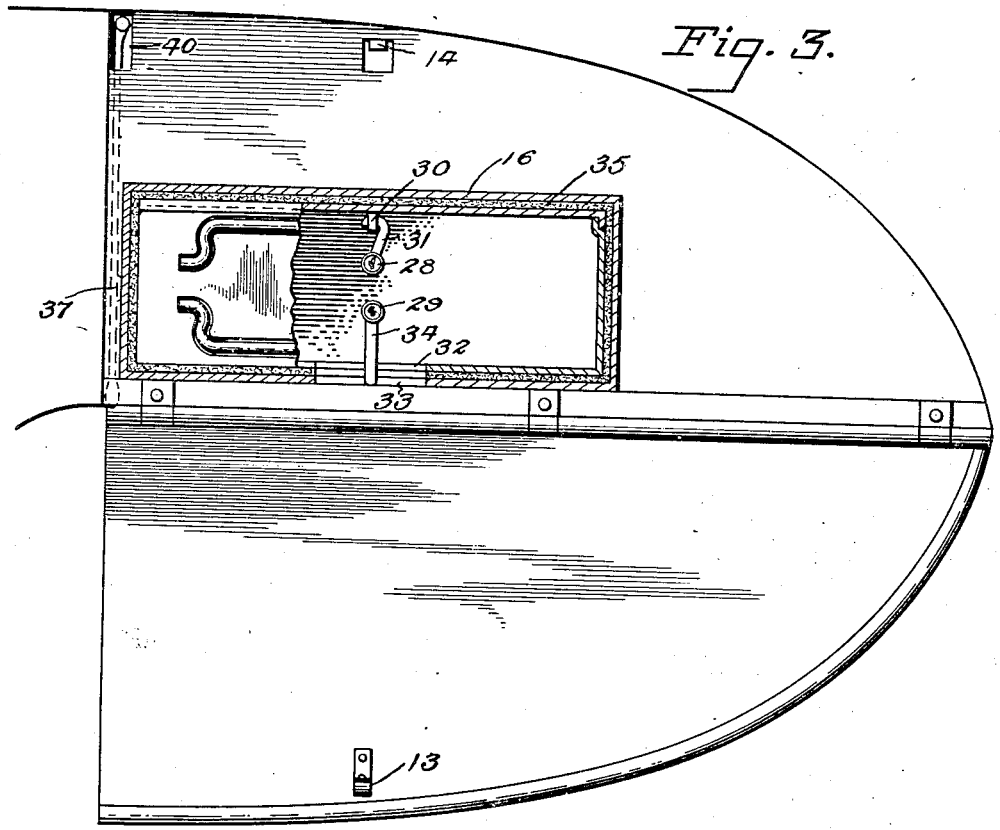
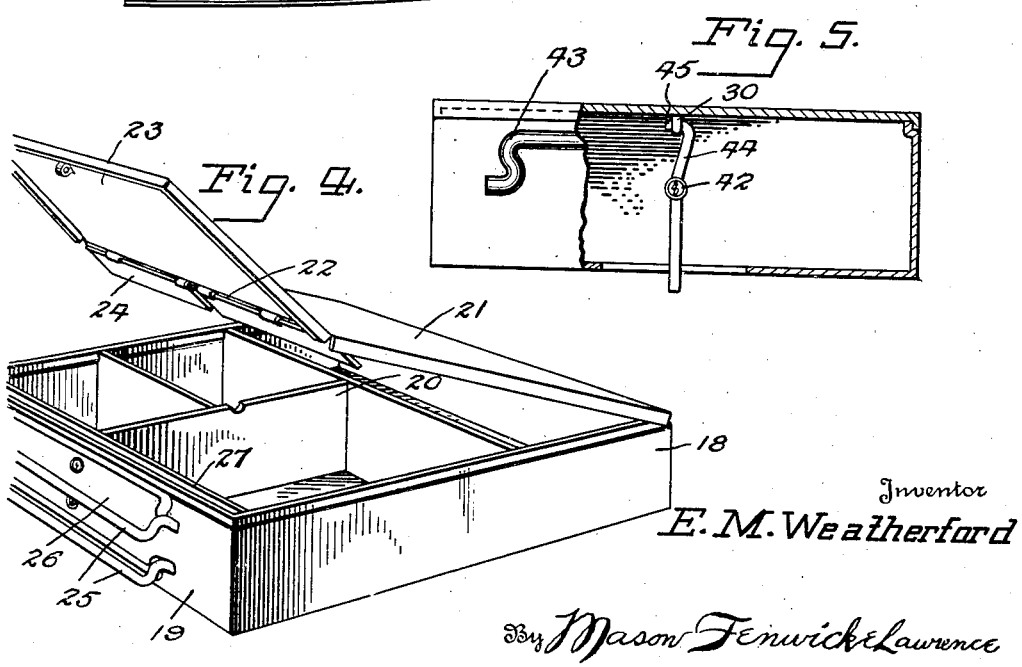
Inventor
E. M. Weatherford
By Mason Fenwick & Lawrence
Attorney Patented Oct. 17, 1933

1,930,573

UNITED STATES PATENT OFFICE 1,930,573

INSTRUMENT PANEL EMBODYING THEFT FOIL FOR VALUABLES

Elizebeth Morgan Weatherford, Louisville, Ky.

Application January 14, 1932. Serial No. 586,678

1 Claim. (Cl. 296—37)

This invention relates to theft foils, and proposes the provision in an automobile of a concealed repository for valuables, designed to be overlooked by a robber ransacking the car or its passengers.

One of the objects of the invention is to provide an instrument panel having a part thereof displaceable but which when in place, being indistinguishable from the rest of the panel and having concealed therebehind a drawer, box, or other receptacle suitable for receiving the valuables which it is desired to secrete.

Another object of the invention is to construct the receptacle in the form of a removable strong box which the owner can carry away with him locked, when he leaves the automobile.

Other objects of the invention relate to details of construction of the instrument panel, strong box, and the hidden means for displacing the movable portion of the panel for gaining access to the strong box.

In the drawings which accompany and form a part of the following specification and in which the same characters of reference have been employed throughout the several figures to designate identical parts:

Figure 1 is a front elevation of an instrument panel embodying the principles of the invention;

Figure 2 is a section taken along the line 2—2 of Figure 1;

Figure 3 is an enlarged front elevation showing part of the panel with the door or displaceable portion in open position revealing the strong box and the compartment in which it slides, partly in section and partly in elevation;

Figure 4 is a perspective view of the strong box itself; and

Figure 5 is a front elevation partly in section showing a modified form of strong box.

Referring now in detail to the several figures, the numeral 1 represents the instrument panel of an automobile, 2 being the transparent window, symmetrically located, through which the usual instruments 3, 4 and 5 may be observed. The instrument panel as shown is formed with symmetrical beads 6 and 7, both sides of the panel being alike in appearance so as to give no suggestion of the presence of the concealed drawer or strong box. As a matter of fact however, the bead 7 represents the side edge of a door 8 which is hinged at its bottom as shown at 9 in Figure 2. It will be noted that in order to provide complete concealment for this hinge, the door is bent anguluarly at 10 beneath the instrument panel so that the hinge is back of the door and out of sight. The upper edge 11 of the door follows closely the contour of the recess in which the instrument panel is mounted and has the same curvature as the instrument panel at the opposite side.

The panel is preferably of double thickness in the part occupied by said door, so that when closed, the door cooperates with a back portion 12 of the instrument panel, best shown in Figure 2. The upper part of the door may be provided on its inner side with a spring latch 13 cooperating with a keeper 14 mounted in a slot 15 in the back portion 12. No handle or other door operating means appears on the front side of the door, it being simply pressed shut so that the latch 13 springs into the hollow of the keeper 14.

Behind the door the rear portion 12 of the instrument panel is provided with a compartment 16 of rectangular cross section and open at the front. It is secured to the portion 12 in any suitable manner or alternatively it may be supported solely by cross bars (not shown) attached to the automobile beneath the cowl. The drawer or strong box 18 slides within this compartment, the front 19 of the strong box appearing substantially flush with the face of the back portion 12 of the instrument panel, when the door 8 is opened. The drawer or strong box 18 may be provided inside with suitable partitions 20. In general it may be designed to receive valuables such as rings, watches, money, etc. The strong box is closed by a hinged lid 21 which for convenience is foldable at an intermediate point 22 so that the forward portion 23 of the lid may be raised when the strong box is pulled only partially out. For purpose of reinforcement, the forward portion 23 has a portion 24 projecting beyond the line of fold beneath the rearward part of the strong box, giving the lid lateral stiffness.

In that form of the strong box shown in Figure 4, two swivelling handles 25 are provided which are adapted to lie flat in a depression or well 26 formed in the front wall of the strong box, so that the handles do not project beyond the plane of its front surface.

A partition 27 is provided to the rear of the front 19 and slidably spaced therefrom forming a compartment in which are located 2 locks 28 and 29. The lid 21 of the strong box has an eye 30 engageable by a swinging hasp 31 operated by the lock 28. The bottom of the lock compartment is formed with a slot 32 adapted to register with a corresponding slot 33 in the bottom wall of the compartment 16. When the lock 29 is operated a swinging bolt 34 enters these slots and locks the strong box in position relative to the instrument panel.

The compartment 16 may be lined with suitable vibration deadening material 35 such as felt or rubber.

For opening the door 8, a rocking lever 36 is provided, the same being pivotally mounted as at 37 to one of the side walls of the compartment 16. The lower end 38 of said rocking lever projects slightly below the compartment 16 in a position accessible from beneath the instrument panel. Pressure of the finger against the end 38 causes the opposite end 39 of the rocking lever which projects through a slot 40 in the back portion of the instrument panel and normally rests substantially in contact with the door 8, to press against said door forcing the latch 13 out of the keeper 14 and permitting the door to fall to the open position shown at 41 in broken lines in Figure 2.

The provision of two locks enables the owner of the automobile to remove the strong box entirely from its association with the instrument panel by one locking the lower lock 34, but without disturbing the locked condition of the strong box itself. By grasping the handles 25 the strong box may be carried in vertical position as conveniently as a small satchel.

A modified form of the invention is shown in Figure 5 in which a single lock 42 and a single handle 43 take the place of the duplicated elements shown in the modification previously described. In this form of the invention, the lock is provided with a single swinging bolt 44, the upper part having an angular end 45 entering the eye 30 in the lid of the strong box and the lower part swinging into position within the alined slots 32 and 33. In this form of the invention when it is desired to pull out the strong box or to remove it, operation of the lock simultaneously unlocks the strong box from the instrument panel and at the same time unlocks the lid. Care must then be taken to relock the lid of the strong box as shown in Figure 5 before attempting to carry the strong box by the handle 43.

It is to be understood that the provision of the beads 6 and 7 is merely exemplary of any desirable expedient of protective mimicry which may be employed in order to disguise the presence of the door 8 and it is also to be understood that the invention resides not so much in the details of construction of the strong box itself or in its means of attachment to the instrument panel, as in the broad concept of having a concealed drawer or strong box mounted in the connection with the instrument panel and of which a portion of the instrument panel forms a concealing feature.

What I claim is:

In a motor vehicle, an instrument panel having similarly shaped end portions, and means symmetrical with respect to a median line extending widthwise of said panel delineating the inner boundaries of said end portions, one of said end portions having an opening, a receptacle support fixed adjacent said opening and having an open end accessible through said opening, and a door hinged to the lower edge of the said end portion of such shape and size that when closed its free edges coincide with corresponding edges of the said end portion which it overlies, and with the means which dilineates the inner boundary of said end portion.

ELIZEBETH MORGAN WEATHERFORD.